United States Patent
Chiu et al.

(10) Patent No.: US 8,957,614 B2
(45) Date of Patent: Feb. 17, 2015

(54) MODULARIZED CONTROL CIRCUIT WITH SIGNAL-CAPTURING FUNCTION FOR FAN MOTOR AND CONTROLLING METHOD

(71) Applicant: Delta Electronics, Inc., Taoyuan County (TW)

(72) Inventors: Chun-Lung Chiu, Taoyuan County (TW); Wen-Chuan Ma, Taoyuan County (TW); Wen-Chih Wang, Taoyuan County (TW)

(73) Assignee: Delta Electronics, Inc. (TW)

( * ) Notice: Subject to any disclaimer, the term of this patent is extended or adjusted under 35 U.S.C. 154(b) by 245 days.

(21) Appl. No.: 13/627,214

(22) Filed: Sep. 26, 2012

(65) Prior Publication Data

US 2013/0249455 A1    Sep. 26, 2013

(30) Foreign Application Priority Data

Mar. 26, 2012    (TW) .............................. 101110416 A

(51) Int. Cl.
*H02K 5/00* (2006.01)

(52) U.S. Cl.
USPC .................................................... 318/400.13

(58) Field of Classification Search
CPC ................................................ H05K 7/20209
USPC .................................................... 318/400.13
See application file for complete search history.

(56) References Cited

U.S. PATENT DOCUMENTS

| | | | |
|---|---|---|---|
| 6,385,395 B1 | 5/2002 | Horng et al. | |
| 6,621,242 B2 | 9/2003 | Huang et al. | |
| 7,218,073 B2 | 5/2007 | Huang et al. | |
| 7,598,690 B2 * | 10/2009 | Yang et al. | 318/254.1 |
| 8,093,848 B2 * | 1/2012 | Suzuki | 318/432 |
| 2007/0047928 A1 * | 3/2007 | Ogino et al. | 388/804 |
| 2012/0181966 A1 * | 7/2012 | Nakamura et al. | 318/465 |

FOREIGN PATENT DOCUMENTS

| | | |
|---|---|---|
| TW | 200918759 | 5/2009 |
| TW | 201203836 | 1/2012 |
| TW | 201208248 | 2/2012 |

OTHER PUBLICATIONS

Office Action dated Jul. 29, 2014 from corresponding No. TW 101110416.

* cited by examiner

*Primary Examiner* — Erick Glass
(74) *Attorney, Agent, or Firm* — Lowe Hauptman & Ham, LLP

(57) ABSTRACT

A modularized control circuit with a signal-capturing function for a fan motor is disclosed. The modularized control circuit includes a driven circuit and a microcontroller integrated circuit. The driven circuit is electrically connected to the fan motor to produce at least one analog driven voltage signal, thus driving the fan motor. The microcontroller integrated circuit is electrically connected to the driven circuit and includes a signal-capturing module, a control unit, and a driven signal generator. The signal-capturing module receives an external pulse signal to produce a cycle-capturing signal. The control unit is connected to the signal-capturing module and receives the cycle-capturing signal to produce a control signal. The driven signal generator is connected to the control unit to receive the control signal, thus producing a plurality of switch driven signals for controlling the driven circuit.

20 Claims, 6 Drawing Sheets

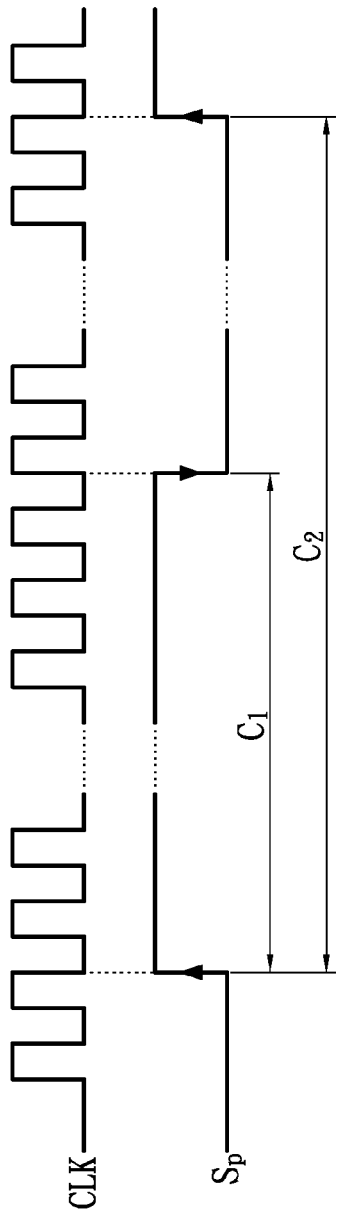
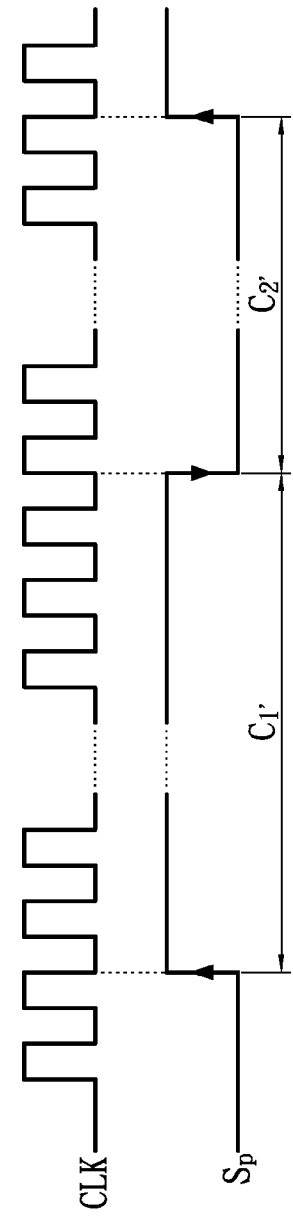
FIG.5A
FIG.5B

MODULARIZED CONTROL CIRCUIT WITH SIGNAL-CAPTURING FUNCTION FOR FAN MOTOR AND CONTROLLING METHOD

This application is based on and claims the benefit of Taiwan Application No. 101110416 filed Mar. 26, 2012 the entire disclosure of which is incorporated by reference herein.

BACKGROUND

1. Technical Field

The present disclosure relates generally to a control circuit for a fan motor and a method of controlling the same, and more particularly to a modularized control circuit with a signal-capturing function for a fan motor and a method of controlling the same.

2. Description of Related Art

For applications of the fan motor, a pulse-width modulation (PWM) technology is usually used to control speed, output power, and so forth of the fan motor. Because of different structures of the motor as well as various loads driven by the motor, the external PWM signal needs to be adjusted to drive and control the rotor of the motor according to practical conditions.

For the signal process of controlling the motor, the digital-to-analog conversion or the low-pass filtering are used to convert the pulse control signal into an analog voltage signal. Afterward, the analog voltage signal is processed by a control logic circuit or a microprocessor with an analog-to-digital function. However, it is easily to cause errors of capturing the frequency or the duty cycle of the pulse control signal because of the limitations of sensitivity of the low-pass filter or the digital-to-analog converter. In addition, a counter is usually used for count operations. Also, the normal operation of the counter is that one access action is executed in one triggering operation thereof. However, the triggering time needs to be increased if the counter has to execute consecutive access action. But, for this reason, it is easily to increase the error risk of setting the trigging time.

Accordingly, it is desirable to provide a modularized control circuit with a signal-capturing function for a fan motor and a method of controlling the same to increase the reliability and convenience of replacement of the control circuit for the fan motor by providing parameter setup via the software, firmware, and the hardware.

SUMMARY

Accordingly, the modularized control circuit with a signal-capturing function operates a duty cycle of an external pulse signal for a fan motor. The modularized control circuit includes a driven circuit and a microcontroller integrated circuit. The driven circuit is electrically connected to the fan motor to produce at least one analog driven voltage signal for driving the fan motor. The microcontroller integrated circuit is electrically connected to the driven circuit and the microcontroller integrated circuit includes a signal-capturing module, a control unit, and a driven signal generator. The signal-capturing module is configured for receiving the external pulse signal to produce a cycle-capturing signal with the duty cycle of the external pulse signal. The control unit is connected to the signal-capturing module and is configured for receiving the cycle-capturing signal to produce a control signal. The driven signal generator is connected to the control unit and is configured for receiving the control signal to produce a plurality of switch driven signals for controlling the driven circuit.

Accordingly, the method of controlling the modularized control circuit with a signal-capturing function operates a duty cycle of an external pulse signal for a fan motor. The method includes following steps: (a) a driven circuit is provided to produce at least one analog driven voltage signal to drive the fan motor; (b) a signal-capturing module is provided to receive the external pulse signal and produce a cycle-capturing signal with the duty cycle of the external pulse signal; (c) a control unit is provided to receive the cycle-capturing signal and produce a control signal; and (d) a driven signal generator is provided to receive the control signal and produce a plurality of switch driven signals for controlling the driven circuit.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWINGS

FIG. 5A is a schematic view of operating a duty cycle of an external pulse signal by the signal-capturing module in FIG. 2 according to the present invention;

FIG. 5B is a schematic view of operating a duty cycle of an external pulse signal by the signal-capturing module in FIG. 3 according to the present invention.

DETAILED DESCRIPTION

Figure 1A:
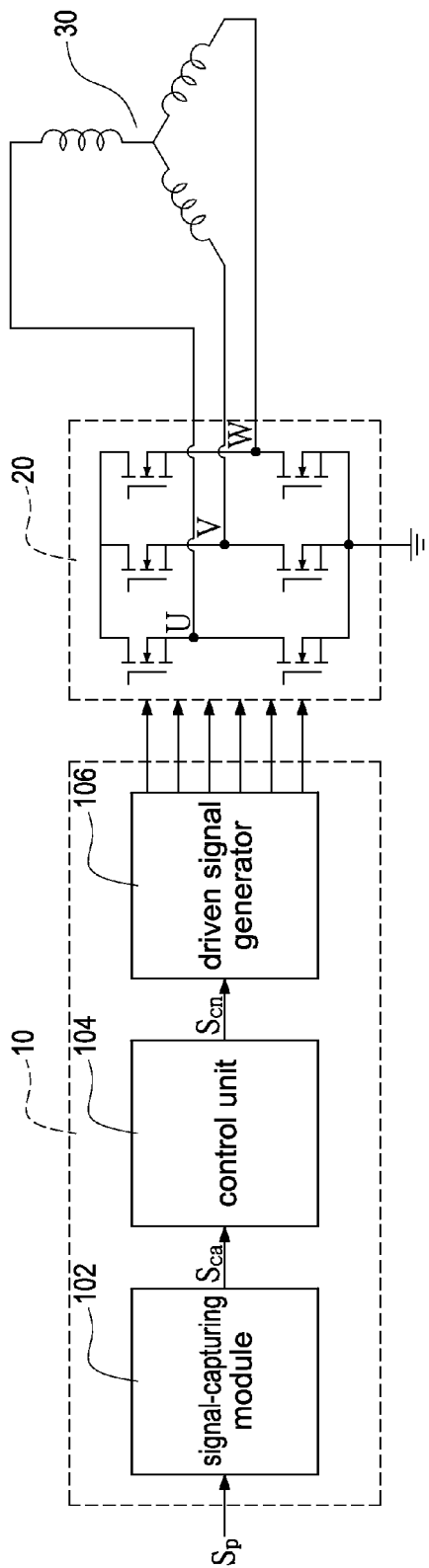
FIG. 1A is a schematic circuit diagram of a modularized control circuit with a signal-capturing function for a three-phase-driven fan motor according to the present invention.

Reference will now be made to the drawing figures to describe the present invention in detail.

Reference is made to FIG. 1A which is a schematic circuit diagram of a modularized control circuit with a signal-capturing function for a three-phase-driven fan motor according to the present invention. The modularized control circuit is provided to operate a duty cycle of an external pulse signal Sp for a fan motor 30. The modularized control circuit includes a driven circuit 20 and a microcontroller integrated circuit 10. More specifically, the external pulse signal Sp can be a pulse-width modulation signal or a pulse signal with arbitrary frequency for regulating and controlling speed of the fan motor 30. In this embodiment, the pulse-width modulation signal is exemplified as the external pulse signal Sp to further demonstrate the present invention.

Figure 1B:
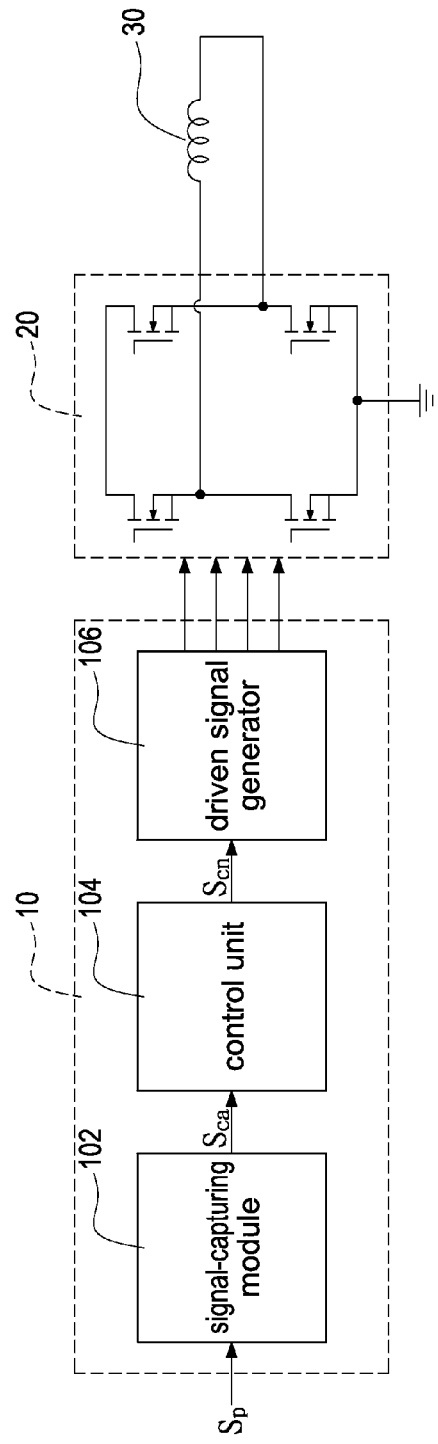
FIG. 1B is a schematic circuit diagram of the modularized control circuit with the signal-capturing function for a full-bridge-driven fan motor according to the present invention.

The driven circuit 20 is electrically connected to the fan motor 30 to produce at least one analog driven voltage signal (not shown) for driving the fan motor 30. In this embodiment, the driven circuit 20 is a three-phase driven circuit having six switches on three sets of legs (not labeled). In addition, the fan motor 30 is a three-phase motor. Hence, the fan motor 30 is driven by a three-phase analog voltage signal, which is produced from the driven circuit 20, composed of U-, V-, and W-phase analog voltage components. In addition, reference is made to FIG. 1B which is a schematic circuit diagram of the modularized control circuit with the signal-capturing function for a full-bridge-driven fan motor according to the present invention. In this embodiment, the driven circuit 20 is a full-bridge driven circuit having four switches on two sets of legs (not labeled). In addition, the fan motor 30 is a single-phase motor. Hence, the fan motor 30 is driven by a single-phase analog voltage signal which is produced from the driven circuit 20. Furthermore, the driven circuit 20 can be also a half-bridge driven circuit (not shown) having two switches on a set of leg to drive a single-phase fan motor 30. For convenience explanation, the three-phase motor and the three-phase driven circuit are exemplified as the fan motor 30 and the driven circuit 20, respectively, to further demonstrate the present invention.

The microcontroller integrated circuit 10 is electrically connected to the driven circuit 20. The microcontroller integrated circuit 10 includes a signal-capturing module 102, a control unit 104, and a driven signal generator 106. In particular, the microcontroller integrated circuit 10 can be a microprocessor (μP), a microcontroller (μC), a field-programmable gate array (FPGA), a programmable integrated circuit, an application-specific integrated circuit (ASIC), or so on, but not limited. The signal-capturing module 102 receives the external pulse signal Sp to produce a cycle-capturing signal Sca with the duty cycle of the external pulse signal Sp. The control unit 104 is connected to the signal-capturing module 102 and receives the cycle-capturing signal Sca to produce a control signal Scn. The driven signal generator 106 is connected to the control unit 104 and receives the control signal Scn to produce a plurality of switch driven signals (not labeled) for controlling the driven circuit 20. In particular, the switch driven signals are provided to control the six switches on three sets of legs.

Figure 2:
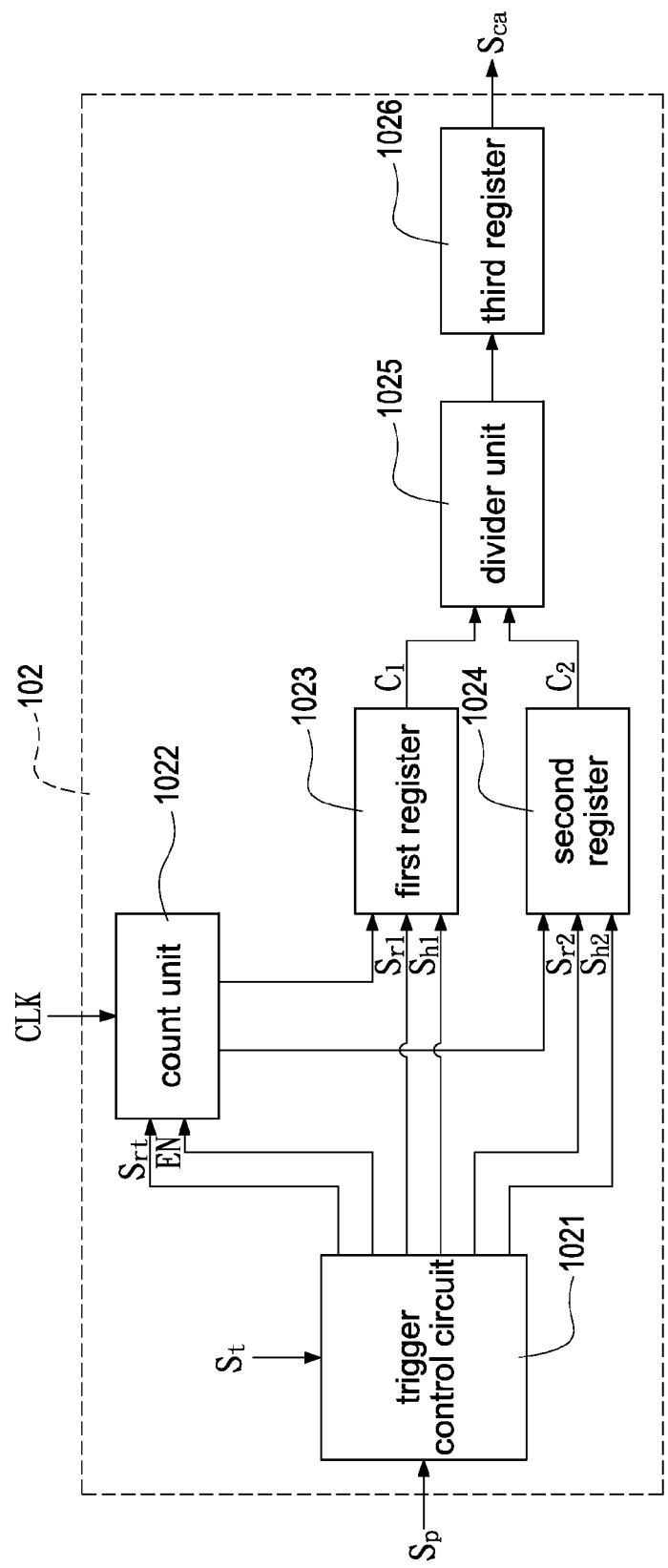
FIGS. 2-4 are schematic circuit diagrams of a signal-capturing module of the modularized control circuit in accordance with some embodiments of the present invention.

The detailed description of operating the modularized control circuit will be made hereinafter. Reference is made to FIG. 2 which is a schematic circuit diagram of a signal-capturing module of the modularized control circuit according to a first embodiment of the present invention. The signal-capturing module 102 includes a trigger control circuit 1021, a count unit 1022, a first register 1023, a second register 1024, a divider unit 1025, and a third register 1026.

The trigger control circuit 1021 has an input terminal (not labeled), a trigger select terminal (not labeled), and a plurality of control output terminals (not labeled). The input terminal receives the external pulse signal Sp. The trigger select terminal receives a trigger select signal St to provide a rising-edge trigging operation or a falling-edge trigging operation. That is, the trigger control circuit 1021 executes a duty cycle operation to the external pulse signal Sp when a level transition of the external pulse signal Sp, namely, high level to low level or low level to high level thereof. In particular, these control output terminals produce a plurality of control signals, respectively. In this embodiment, these control signals are a rest signal Srt to a count unit, an enable signal EN to the count unit 1022, a reset signal Sr1 to a first register 1023, a reset signal Sr2 to a second register 1024, a latch signal Sh1 to the first register 1023, and a latch signal Sh2 to the second register 1024, but not limited. Note that, other different control signals may be provided depending on different implementations.

The count unit 1022 is connected to the trigger control circuit 1021 to receive a system clock signal CLK, the reset signal Srt to the count unit 1022, and the enable signal EN to the count unit 1022 to produce a first count value C1 and a second count value C2. In particular, the count unit 1022 is either synchronously or asynchronously reset. The first register 1023 is connected to the trigger control circuit 1021 to receive the reset signal Sr1 to the first register 1023, the first count value C1, and the latch signal Sh1 to the first register 1023. The second register 1024 is connected to the trigger control circuit 1021 to receive the reset signal Sr2 to the second register 1024, the second count value C2, and the latch signal Sh2 to the second register 1024. The divider unit 1025 is connected to the first register 1023 and the second register 1024 to receive the first count value C1 and the second count value C2 and the divider unit 1025 provides a division operation on the first count value C1 and the second count value C2 to produce the cycle-capturing signal Sca. The third register 1026 is connected to the divider unit 1025 to receive and output the cycle-capturing signal Sca.

The detailed operation of the trigger control circuit 1021 will be made hereinafter with reference to FIG. 5A which is a schematic view of operating a duty cycle of an external pulse signal by the signal-capturing module in FIG. 2 according to the present invention. In this embodiment, the trigger control circuit 1021 provides a time difference between a rising-edge trigging operation and a falling-edge trigging operation as a turned-on-period time of the external pulse signal Sp and provides a time difference between two rising-edge trigging operations as a full-period time of the external pulse signal Sp.

The trigger control circuit 1021 sends the high-level enable signal EN to the count unit 1022 to enable the count unit 1022 starting to count when the trigger control circuit 1021 detects that a level transition from a low level to a high level of the external pulse signal Sp. In particular, the count unit 1022 can provide either an up-count mode operation or a down-count mode operation. In addition, the trigger control circuit 1021 sends the a high-level reset signal Srt to reset the count value of the count unit 1022 in zero or the maximum value according to the up-count mode or down-count mode operation before the count unit 1022 acts.

The trigger control circuit 1021 sends the latch signal Sh1 to latch the first register 1023 and sends the first count value C1 of the count unit 1022 to the first register 1023 and the divider unit 1025 when the trigger control circuit 1021 detects that a level transition from a high level to a low level of the external pulse signal Sp. Similarly, the trigger control circuit 1021 sends the latch signal Sh2 to latch the second register 1024 and sends the second count value C2 of the count unit 1022 to the second register 1024 and the divider unit 1025 when the trigger control circuit 1021 detects that a level transition from a low level to a high level of the external pulse signal Sp.

The divider unit 1025 receives the first count value C1 in the first register 1023 and the second count value C2 in the second register 1024, respectively, to provide a division operation on the first count value C1 and the second count value C2 to produce the cycle-capturing signal Sca with the duty cycle of the external pulse signal Sp. That is, in this embodiment, the duty cycle of the external pulse signal Sp is equal to a ratio of the first count value C1 to the second count value C2. If it is assumed that the first count value C1 is 80 and the second count value C2 is 100, the duty cycle of the external pulse signal Sp is equal to 80% (namely, 80/100× 100%=80%).

Especially, the above-mentioned turned-on-period time and full-period time are not limited to be provided by the first register 1023 and the second register 1024, respectively. In other words, the first register 1023 can exchange its role with the second register 1024 to provide the full-period time and the turned-on-period time is provided by the second register 1024.

Figure 3:
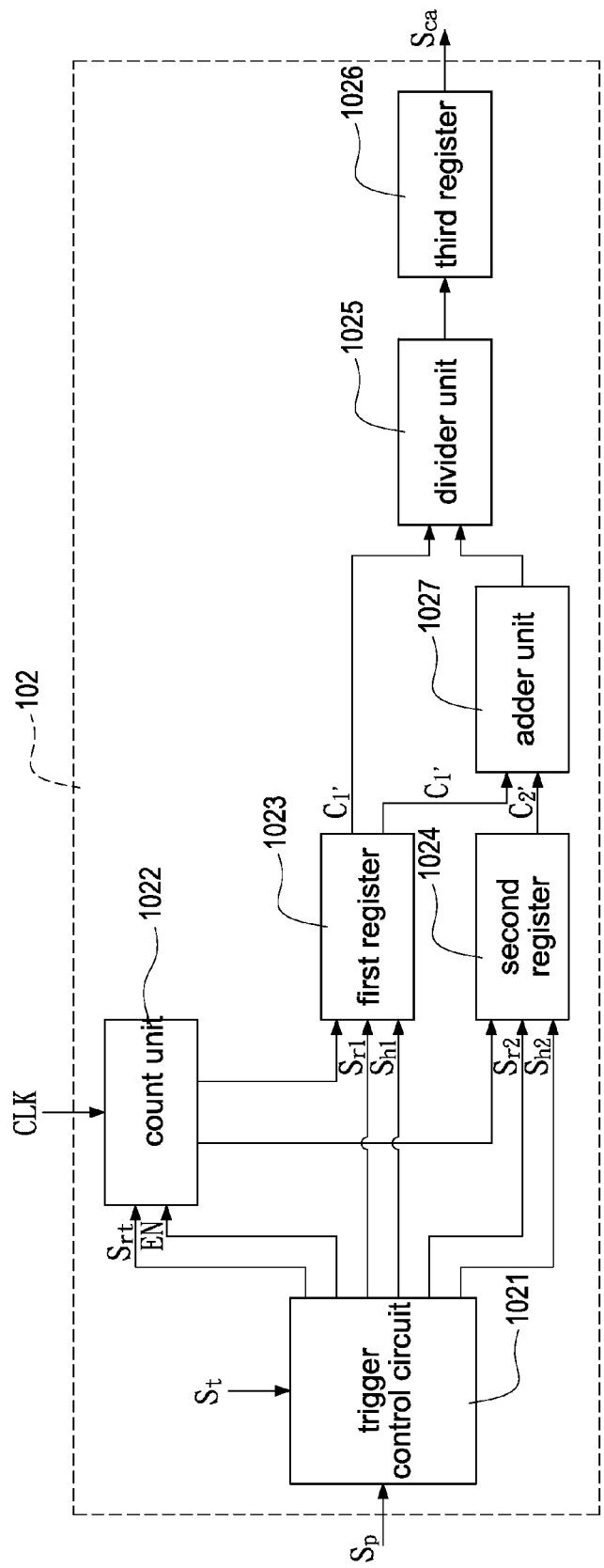

Reference is made to FIG. 5B which is a schematic view of operating a duty cycle of an external pulse signal by the signal-capturing module in FIG. 3 according to the present invention. In this embodiment, the trigger control circuit 1021 provides a time difference between a rising-edge trigging operation and a falling-edge trigging operation as a turned-on-period time of the external pulse signal Sp and provides a time difference between a falling-edge trigging operation and a rising-edge trigging operation as a turned-off-period time of the external pulse signal Sp. Especially, the signal-capturing module 102 further has an adder unit 1027. The adder unit 1027 is connected to the first register 1023 and the second register 1024 to receive the first count value C1' and the second count value C2' and provides an addition operation on the first count value C1' and the second count value C2' to produce an added value.

The trigger control circuit 1021 sends the high-level enable signal EN to the count unit 1022 to enable the count unit 1022 starting to count when the when trigger control circuit 1021 detects that a level transition from a low level to a high level of the external pulse signal Sp. In particular, the count unit 1022 can provide either an up-count mode operation or a down-count mode operation. In addition, the trigger control circuit 1021 sends the a high-level reset signal Srt to reset the count value of the count unit 1022 in zero or the maximum value according to the up-count mode or down-count mode operation before the count unit 1022 acts.

The trigger control circuit 1021 sends the latch signal Sh1 to latch the first register 1023 and sends the first count value C1' of the count unit 1022 to the first register 1023 and the divider unit 1025 when the trigger control circuit 1021 detects that a level transition from a high level to a low level of the external pulse signal Sp. Moreover, the trigger control circuit 1021 sends the high-level reset signal Srt to reset the count value of the count unit 1022 in zero or the maximum value. In addition, the trigger control circuit 1021 sends the latch signal Sh2 to latch the second register 1024 and sends the second count value C2' of the count unit 1022 to the second register 1024 and the adder unit 1027 when the trigger control circuit 1021 detects that a level transition from a low level to a high level of the external pulse signal Sp.

The divider unit 1025 receives the first count value C1' in the first register 1023 and a sum value of the first count value C1' and the second count value C2' (namely, C1'+C2') and the divider unit 1025 provides a division operation on the first count value C1' and the sum value C1'+C2' to produce the cycle-capturing signal Sca with the duty cycle of the external pulse signal Sp. That is, in this embodiment, the duty cycle of the external pulse signal Sp is equal to a ratio of the first count value C1' to the sum value C1'+C2'. If it is assumed that the first count value C1' is 80 and the second count value C2' is 20, the duty cycle of the external pulse signal Sp is equal to 80% (namely, 80/(80+20)×100%=80%).

Especially, the above-mentioned turned-on-period time and turned-off-period time are not limited to be provided by the first register 1023 and the second register 1024, respectively. In other words, the first register 1023 can exchange its role with the second register 1024 to provide the turned-off-period time and the turned-on-period time is provided by the second register 1024.

In addition, the signal-capturing module 102 further has an overflow count unit (not shown), a first overflow register (not shown), and a second overflow register (not shown). The overflow count unit is connected to the trigger control circuit 1021 to provide an overflow operation of the count unit 1022. That is, the trigger control circuit 1021 sends a reset signal or a set signal to control the overflow count unit when an overflow occurs during the count operation of the count unit 1022.

The first overflow register is connected to the trigger control circuit 1021 to provide an overflow operation of the first register 1023. That is, the trigger control circuit 1021 sends a reset signal or a set signal to control the first overflow register when an overflow occurs during the data-registering operation of the first register 1023. Similarly, the second overflow register is connected to the trigger control circuit 1021 to provide an overflow operation of the second register 1024. That is, the trigger control circuit 1021 sends a reset signal or a set signal to control the second overflow register when an overflow occurs during the data-registering operation of the second register 1024.

Figure 4:
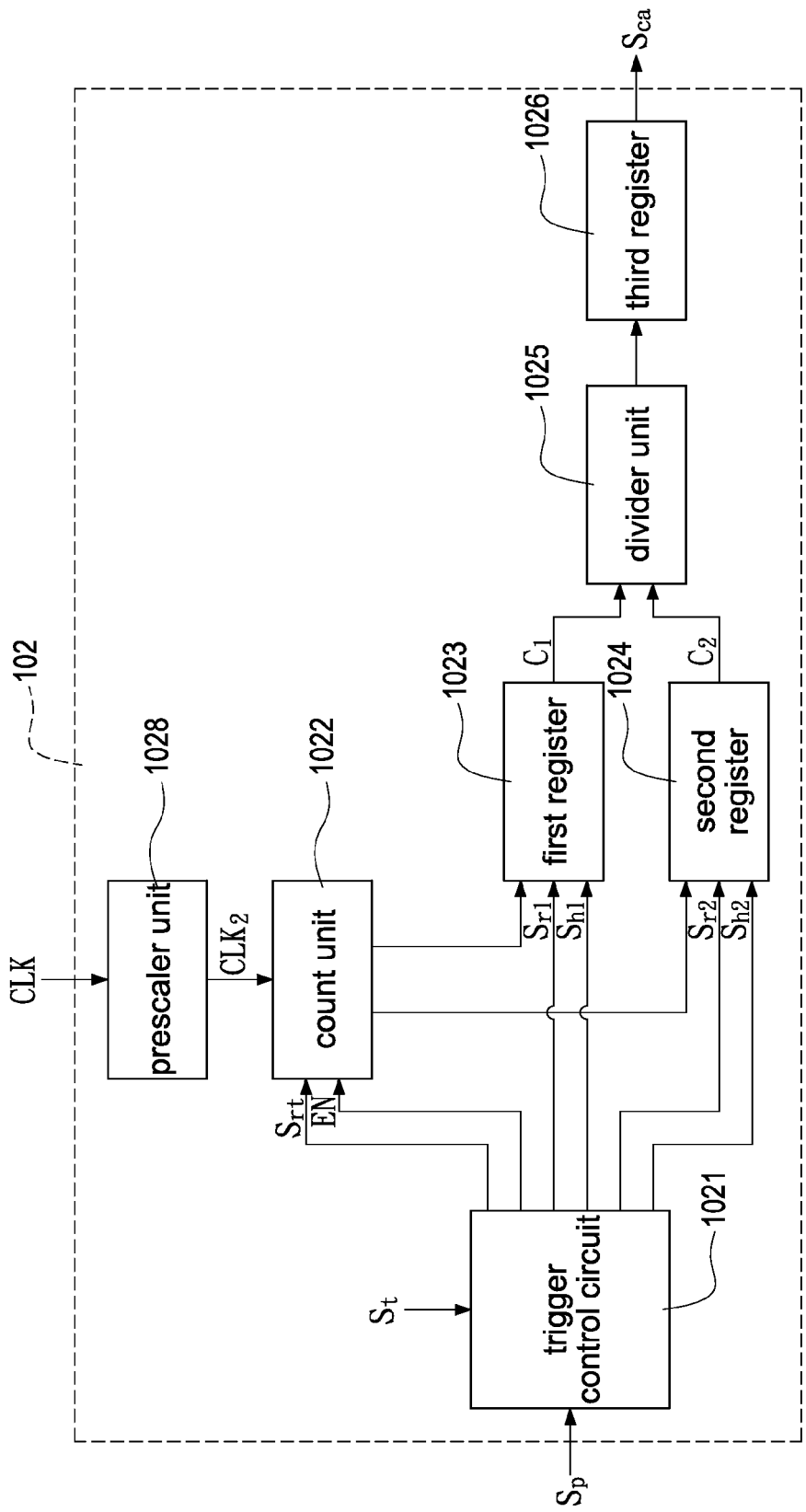

Reference is made to FIG. 4 which is a schematic circuit diagram of the signal-capturing module of the modularized control circuit according to a third embodiment of the present invention. The main difference between the third embodiment and the first embodiment is that the signal-capturing module 102 further has a prescaler unit 1028, but the rest is the same. The prescaler unit 1028 is connected to the count unit 1022 to receive the system clock signal CLK and process a duty cycle of the system clock signal CLK, and then the processed system clock signal, namely, a prescale clock signal CLK2, is sent to the count unit 1022 to be a system clock reference for the count unit 1022. Because the operation is the same at the third embodiment and the first embodiment except the prescaler unit 1028, the detail description is omitted here for conciseness.

Figure 6:
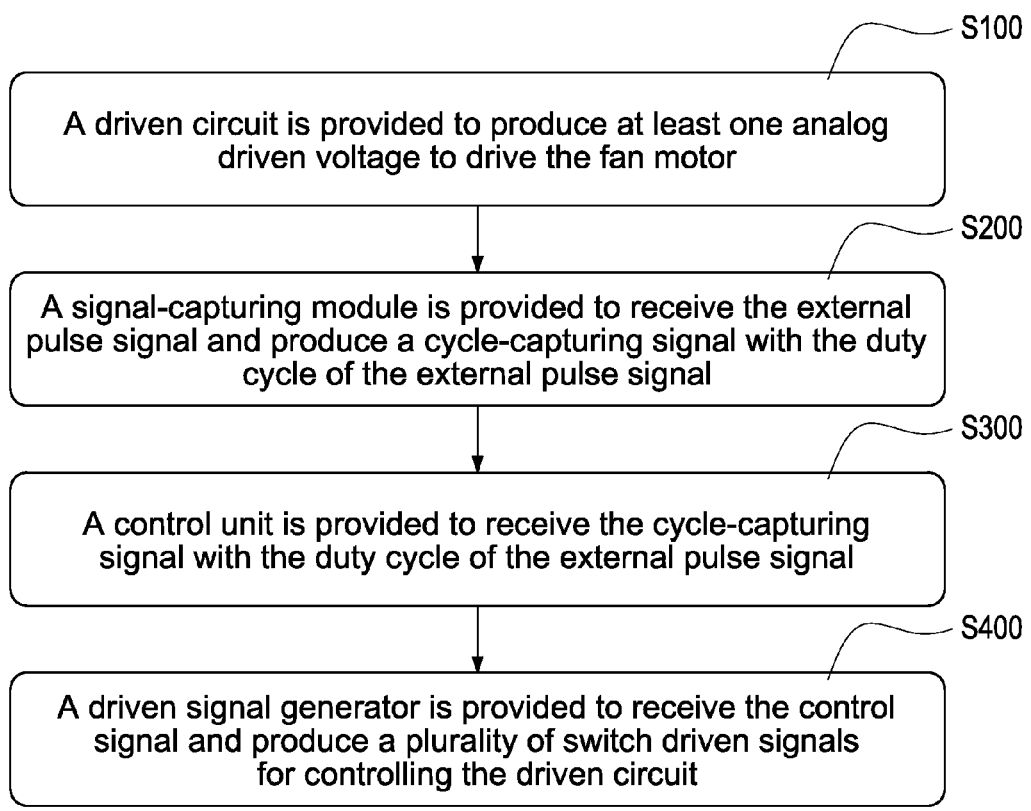
FIG. 6 is a flowchart of a method of controlling a modularized control circuit with a signal-capturing function for a fan motor according to the present invention.

Reference is made to FIG. 6 which is a flowchart of a method of controlling a modularized control circuit with a signal-capturing function for a fan motor according to the present invention. The method of controlling the modularized control circuit with a signal-capturing function operates a duty cycle of an external pulse signal for a fan motor. The method includes following steps: A driven circuit is provided to produce at least one analog driven voltage to drive the fan motor (S100). More specifically, the external pulse signal can be a pulse-width modulation signal or a pulse signal with arbitrary frequency for regulating and controlling speed of the fan motor.

A signal-capturing module is provided to receive the external pulse signal and produce a cycle-capturing signal with the duty cycle of the external pulse signal (S200). In particular, the signal-capturing module has a trigger control circuit, a count unit, a first register, a second register, a divider unit, and a third register.

The trigger control circuit has an input terminal, a trigger select terminal, and a plurality of control output terminals. The input terminal receives the external pulse signal. The trigger select terminal receives a trigger select signal to provide a rising-edge trigging operation and a falling-edge trigging operation. That is, the trigger control circuit executes a duty cycle operation to the external pulse signal when a level transition of the external pulse signal, namely, high level to low level or low level to high level thereof. The control output terminals output a rest signal to the count unit, an enable signal to the count unit, a rest signal to the first register, a rest signal to the second register, a latch signal to the first register, and a latch signal to the second register.

The count unit is connected to the trigger control circuit to receive a system clock signal, the reset signal to the count unit, and the enable signal to the count unit to produce a first count value and a second count value. In particular, the count unit is either synchronously or asynchronously reset. The first register is connected to the trigger control circuit to receive the reset signal to the first register, the first count value, and the latch signal to the first register. The second register is connected to the trigger control circuit to receive the reset signal to the second register, the second count value, and the latch signal to the second register. The divider unit is connected to the first register and the second register to receive the first count value and the second count value and the divider unit provides a division operation on the first count value and the second value to produce the cycle-capturing signal. The third register is connected to the divider unit to receive and output the cycle-capturing signal.

The signal-capturing module further has an adder unit. The adder unit is connected to the first register and the second register to receive the first count value and the second count value and provides an addition operation on the first count value and the second count value to produce an added value. In particular, the added value is sent to the divider unit. The divider unit provides a division operation on the first count value and the added value to produce a divided result and the divided result is sent to the third register to produce the cycle-capturing signal. The signal-capturing module further has an overflow count unit, a first overflow register, a second overflow register. The overflow count unit is connected to the trigger control circuit to provide an overflow operation of the count unit. The first overflow register is connected to the trigger control circuit to provide an overflow operation of the first register. The second overflow register is connected to the trigger control circuit to provide an overflow operation of the second register. The signal-capturing module further has a prescaler unit. The prescaler unit is connected to the count unit to receive the system clock signal and process a duty cycle of the system clock signal, and then the processed system clock signal is sent to the count unit. A control unit is provided to receive the cycle-capturing signal with the duty cycle of the external pulse signal (S300). A driven signal generator is provided to receive the control signal and produce a plurality of switch driven signals for controlling the driven circuit (S400). Especially, the signal-capturing module, the control unit, and the driven signal generator are packaged into a microcontroller integrated circuit. In addition, the microcontroller integration circuit is a microprocessor (µP), a microcontroller (µC), a field-programmable gate array (FPGA), a programmable integrated circuit, an application-specific integrated circuit (ASIC), or so on, but not limited.

In conclusion, the present invention has following advantages:

1. The signal-capturing module 102, the control unit 104, and the driven signal generator 106 are packaged into a microcontroller integrated circuit, which is controlled by software, firmware, or hardware to increase reliability of operating the modularized control circuit and convenience of replacing thereof; and 2. The signal-capturing module 102 is provided to operate a duty cycle of the external pulse signal Sp. When the trigger control circuit 1021 detects that a level transition of the external pulse signal Sp, the count unit 1022 is used to provide count operations and a plurality of registers are used to provide consecutive access without resetting triggering times.

Although several embodiments of the present invention have been described in detail, it will be understood that the disclosure is not limited to such details. Various substitutions will occur to those of ordinary skill in the art of the foregoing description. Therefore, all such substitutions and modifications are intended to be embraced within the scope of this disclosure.

What is claimed is:

1. A modularized control circuit with a signal-capturing function, the modularized control circuit operating a duty cycle of an external pulse signal for a fan motor and comprising:
   a driven circuit electrically connected to the fan motor to produce at least one analog driven voltage signal for driving the fan motor; and
   a microcontroller integrated circuit electrically connected to the driven circuit, the microcontroller integrated circuit comprising:
      a signal-capturing module comprising:
         a trigger control circuit configured to receive the external pulse signal;
         a count unit connected to the trigger control circuit and configured to produce a first count value and a second count value; and
         a divider unit configured to receive the first count value and the second count value, and provide a division operation on the first count value and the second count value to produce a cycle-capturing signal with the duty cycle of the external pulse signal;
      a control unit connected to the signal-capturing module and configured for receiving the cycle-capturing signal to produce a control signal; and
      a driven signal generator connected to the control unit and configured for receiving the control signal to produce a plurality of switch driven signals for controlling the driven circuit.

2. The modularized control circuit in claim 1, wherein the trigger control circuit comprises:
   an input terminal configured to receive the external pulse signal;
   a trigger select terminal configured to receive a trigger select signal to provide a rising-edge trigging operation and a falling-edge trigging operation; and
   a plurality of control output terminals configured to output a reset signal to a count unit, an enable signal to the count unit, a reset signal to a first register, a reset signal to a second register, a latch signal to the first register, and a latch signal to the second register;
   the count unit is configured to receive a system clock signal, the reset signal to the count unit, and the enable signal to the count unit to produce the first count value and the second count value;
   the first register is connected to the trigger control circuit and the divider unit, and configured to receive the reset signal to the first register, the first count value, and the latch signal to the first register;
   the second register is connected to the trigger control circuit and configured to receive the reset signal, the second count value, and the latch signal; and
   a third register is connected to the divider unit and configured to receive and output the cycle-capturing signal.

3. The modularized control circuit in claim 2, wherein the signal-capturing module further comprises:
   an adder unit connected to the first register and the second register and configured to receive the first count value and the second count value and configured to provide an addition operation on the first count value and the second count value to produce an added value;
   wherein the added value is sent to the divider unit; the divider unit is configured to provide a division operation on the first count value and the added value to produce a divided result; the divider unit is configured to send the divided result to the third register to produce the cycle-capturing signal.

4. The modularized control circuit in claim 2, wherein the signal-capturing module further comprises:
an overflow count unit connected to the trigger control circuit to provide an overflow operation of the count unit;
a first overflow register connected to the trigger control circuit to provide an overflow operation of the first register; and
a second overflow register connected to the trigger control circuit to provide an overflow operation of the second register.

5. The modularized control circuit in claim 2, wherein the signal-capturing module further comprises:
a prescaler unit connected to the count unit and configured to receive the system clock signal and to process a duty cycle of the system clock signal; the prescaler unit is configured to send the processed system clock signal to the count unit.

6. The modularized control circuit in claim 2, wherein the count unit is either synchronously or asynchronously reset.

7. The modularized control circuit in claim 1, wherein the driven circuit is a three-phase driven circuit, a half-bridge driven circuit, or a full-bridge driven circuit.

8. The modularized control circuit in claim 1, wherein the external pulse signal is provided to regulate and control speed of the fan motor.

9. The modularized control circuit in claim 1, wherein the external pulse signal is a pulse-width modulation signal or a pulse signal with arbitrary frequency.

10. The modularized control circuit in claim 1, wherein the microcontroller integration circuit is a microprocessor (μP), a microcontroller (μC), a field-programmable gate array (FPGA), a programmable integrated circuit, or an application-specific integrated circuit (ASIC).

11. A method of controlling a modularized control circuit with a signal-capturing function, the modularized control circuit operating a duty cycle of an external pulse signal for a fan motor, the method comprising:
providing a driven circuit to produce at least one analog driven voltage signal to drive the fan motor;
providing a signal-capturing module, wherein the signal-capturing module comprises a trigger control circuit, a count unit, and a divider unit, the trigger control circuit is configured to receive the external pulse signal, the control unit is connected to the trigger control circuit and configured to produce a first count value and a second count value, the divider unit is configured to receive the first count value and the second count value, and the divider unit is configured to provide a division operation on the first count value and the second count value to produce a cycle-capturing signal with the duty cycle of the external pulse signal;
providing a control unit to receive the cycle-capturing signal and produce a control signal; and
providing a driven signal generator to receive the control signal and produce a plurality of switch driven signals for controlling the driven circuit.

12. The method of controlling the modularized control circuit in claim 11, wherein the signal-capturing module, the control unit, and the driven signal generator are packaged into a microcontroller integrated circuit.

13. The method of controlling the modularized control circuit in claim 11, wherein
the trigger control circuit comprises:
an input terminal configured to receive the external pulse signal;
a trigger select terminal configured to receive a trigger select signal to provide a rising-edge trigging operation and a falling-edge trigging operation; and
a plurality of control output terminals configured to output a reset signal to a count unit, an enable signal to the count unit, a reset signal to a first register, a reset signal to a second register, a latch signal to the first register, and a latch signal to the second register;
the count unit is configured to receive a system clock signal, the reset signal to the count unit, and the enable signal to the count unit to produce the first count value and the second count value;
the first register is connected to the trigger control circuit and the divider unit, and configured to receive the reset signal to the first register, the first count value, and the latch signal to the first register;
the second register is connected to the trigger control circuit and configured to receive the reset signal, the second count value, and the latch signal; and
a third register is connected to the divider unit and configured to receive and output the cycle-capturing signal.

14. The method of controlling the modularized control circuit in claim 11, wherein the signal-capturing module further comprises:
an adder unit connected to the first register and the second register and configured to receive the first count value and the second count value and configured to provide an addition operation on the first count value and the second count value to produce an added value;
wherein the added value is sent to the divider unit; the divider unit is configured to provide a division operation on the first count value and the added value to produce a divided result; the divider unit is configured to send the divided result to the third register to produce the cycle-capturing signal.

15. The method of controlling the modularized control circuit in claim 11, wherein the signal-capturing module further comprises:
an overflow count unit connected to the trigger control circuit to provide an overflow operation of the count unit;
a first overflow register connected to the trigger control circuit to provide an overflow operation of the first register; and
a second overflow register connected to the trigger control circuit to provide an overflow operation of the second register.

16. The method of controlling the modularized control circuit in claim 11, wherein the signal-capturing module comprises:
a prescaler unit is connected to the count unit and configured to receive the system clock signal and process a duty cycle of the system clock signal; the prescaler unit is configured to send the processed system clock signal to the count unit.

17. The method of controlling the modularized control circuit in claim 11, wherein the count unit is either synchronously or asynchronously reset.

18. The method of controlling the modularized control circuit in claim 11, wherein the external pulse signal is provided to regulate and control speed of the fan motor.

19. The method of controlling the modularized control circuit in claim 11, wherein the external pulse signal is a pulse-width modulation signal or a pulse signal with arbitrary frequency.

20. The method of controlling the modularized control circuit in claim 12, wherein the microcontroller integration circuit is a microprocessor (µP), a microcontroller (µC), a field-programmable gate array (FPGA), a programmable integrated circuit, or an application-specific integrated circuit (ASIC).

* * * * *